UNITED STATES PATENT OFFICE.

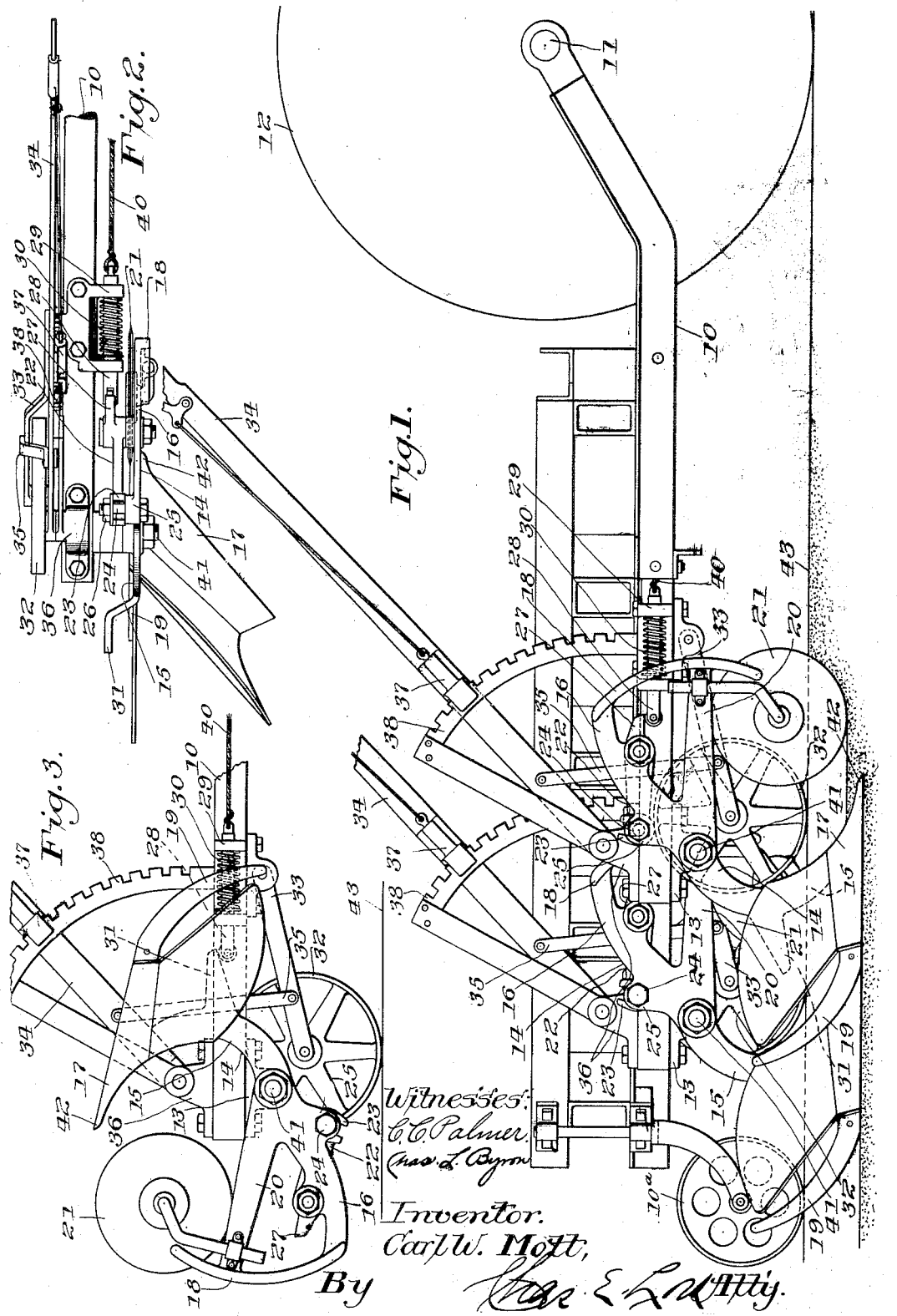

CARL W. MOTT, OF CHICAGO, ILLINOIS, ASSIGNOR, BY MESNE ASSIGNMENTS, TO INTERNATIONAL HARVESTER COMPANY, A CORPORATION OF NEW JERSEY.

PLOW.

1,319,483.  Specification of Letters Patent.  Patented Oct. 21, 1919.

Application filed September 3, 1914. Serial No. 859,958.

*To all whom it may concern:*

Be it known that I, CARL W. MOTT, a citizen of the United States, residing at Chicago, in the county of Cook and State of Illinois, have invented certain new and useful Improvements in Plows, of which the following is a full, clear, and exact specification.

This invention relates to plows.

The main object of this invention is to accomplish the raising and lowering of a plow in a simple and practical manner.

Another object of my invention is to provide a rotatably mounted plow base which is capable of raising and lowering itself with respect to land to be plowed.

These and other objects are accomplished by providing a plow base, and means whereby said plow base may be rotated from one definite position to another.

The invention is illustrated on the accompanying sheet of drawings, in which—

Figure 1 is a side elevation of a plow embodying my invention;

Fig. 2 is a fragmentary plan view of the same plow shown in Fig. 1; and,

Fig. 3 is a fragmentary side elevation of a single plow base embodying my invention, the plow base being held in its raised position.

The various novel features of my invention will be apparent from the following description and drawings, and will be particularly set forth in the appended claims.

Reference being had to figures of the drawing, I have shown a main supporting frame 10 secured to the rear axle 11 of a tractor 12, said frame being supported in the rear by a caster wheel 10ᵃ. Secured to the rear portion of said frame are a plurality of brackets 13 in each of which is rotatably mounted a frame 14. This frame includes oppositely extending arms 15 and 16, to one of which, 15, is secured a plow base 17, and to the other of which is secured at the end thereof an arcuate traction member 18, which is instrumental in rotating the plow from its operative position, as shown in Fig. 1, into its inoperative position, as shown in Fig. 3. Secured to the plow base 17 and opposite from the traction member 18 is another arcuate traction member 19, which is effective in assisting the plow in its movement from an inoperative position, as shown in Fig. 3, to its operative position shown in Fig. 1. This action will be considered more in detail hereinafter.

Forming also a part of the auxiliary frame 14 is an arm 20 connected to the arcuate traction member 18, and having adjustably secured therein a colter wheel 21. Pivotally mounted in the arm 16 of frame 14 is an arm 22 having a U-shaped or forked portion 23 for the reception of a bolt 24 passing through a portion 25 of the frame 14. This arm 22 and frame 14 are frictionally locked by tightening a nut 26 on the bolt 24, which normally holds said parts firmly with respect to each other. The arm 22 also is provided with a projection 27 which normally engages a stop member 28, which is slidably mounted in a suitable bracket 29, said stop member being held in its operative position by a spring 30 surrounding said stop member and mounted in said bracket. This stop member also lies in the path of a projection 31 on the frame member 14 for holding the auxiliary frame and plow base in its raised or inoperative position, as shown in Fig. 3.

For varying the depth of the plow base the depth wheel 32 is pivotally connected by a link 33 to the bracket 29. The depth wheel 32 is regulated by the hand operated lever 34 which is connected to the link 33 by a link 35. This hand operated lever 34 is pivotally mounted in a bracket 36, and has a detent 37 for engaging teeth of the segment 38.

As shown in Fig. 1 the plow bases are all in their operative or lowered position for plowing purposes, the plow being drawn by any suitable means, such as the tractor 12. If it is desired to raise any one or all of the plow bases out of the ground, this may be accomplished by pulling on the particular cable or cables 40, which will cause the stop member or members 28 to be drawn out of the path of movement of the projection 27 on arm 22. With stop member 28 removed from its normal position while the whole plow structure is being advanced, the auxiliary frame 14 will rotate about its pivotal center 41, the point 42 of the plow base remaining substantially stationary, and the back portion of the plow base being raised gradually. At the same time the arcuate traction member 18 will pass into engagement with the ground 43 for causing further rotation of the plow base 17 and auxiliary frame 14 into the position shown in Fig. 3, in which position the plow is held by the projection 31 engaging with the stop member 28, which stop member, in the meantime, has been permittel to return to its normal position by the action of spring 30. The arcuate traction member 18 remains in contact with the ground until the center of gravity of the plow base has passed the vertical line passing through the pivotal center 41 of the plow frame 14, whereupon the plow base 17 falls, of its own weight, into the inoperative position, as shown in Fig. 3.

If it is desired to lower the plow base into the ground from its raised position, the same may be accomplished by again withdrawing the stop member 28, by pulling on cable 40, whereupon the plow base, of its own weight, will fall into a position such that the free end of the arcuate traction member 19 will engage the ground, whereupon further rotation of the plow base is continued until the point of the bottom passes into engagement with the ground, at which time the plow base will assume the proper plowing depth. It is seen, therefore, that the plow, in a true sense, is a self-lift plow, and may be rotated from its operative position to its inoperative position during the advance of the main plow structure by merely drawing the stop member 28 from the path of movement of the projection 27, and that the plow base may be rotated further from its raised position into its normal operative or lowered position by withdrawing the stop member 28 from the path of movement of the other projection 31. It is to be noted that the colter wheel 21 is rotated bodily with the plow base as said plow base is raised and lowered. If it is desired to raise the plow bases in any particular succession, the same may be accomplished by pulling the cables in the desired order. The plow bases may all be raised and lowered at the same time, or individually in any order.

Should any one of the plow bases strike a rock or other obstruction which would not give, the frictional engagement between the plow frame 14 and the arm 22 will yield, permitting the plow bases to rotate out of engagement with the obstruction without damaging any part of the plow.

It is evident that there may be various modifications of my invention as herein particularly shown and described, and it is my intention to cover all such modifications which do not involve a departure from the spirit and scope of my invention as set forth in the appended claims.

What I claim is:

1. A plow comprising a main frame, an auxiliary frame pivotally mounted for complete rotation thereon in a vertical plane, a plow base and additional ground engaging means carried by said auxiliary frame, means whereby said ground engaging means may cause a partial rotation of said auxiliary frame into a position in which both the plow base and auxiliary frame are clear of the ground, and means for causing a further rotation of said auxiliary frame in the same direction to a position in which the plow base engages the ground.

2. A plow comprising a main frame, an auxiliary frame pivotally mounted for complete rotation thereon in a vertical plane, a plow base carried by said auxiliary frame, means for rotating said auxiliary frame to shift its center of gravity from one side of its pivot to the other and bring said plow base into an elevated inoperative position clear of the ground, and means under the control of the operator for maintaining the parts in such position.

3. A plow comprising a main frame, an auxiliary frame pivotally mounted on said main frame, a plow base carried by said auxiliary frame and arranged to be brought into operative and inoperative position by rotation of such auxiliary frame about its pivot, said auxiliary frame being rotatable by gravity to bring said plow base into contact with the ground, and means for further rotating said auxiliary frame in the same direction to bring said plow base into inoperative position clear of the ground.

4. A plow comprising a main frame, an auxiliary frame pivotally mounted on said main frame, a plow base carried by said auxiliary frame and arranged to be brought into operative and inoperative position by rotation of such auxiliary frame about its pivot, means for rotating said auxiliary frame to bring said plow base into an inoperative position above the ground, in which position the auxiliary frame is unbalanced, and from which position the plow base tends to fall by gravity into engagement with the ground, and manually releasable means for restraining such falling movement.

5. A plow comprising a main frame, an auxiliary frame pivotally mounted on said main frame, a plow base carried by said auxiliary frame and arranged to be brought into operative and inoperative position by rotation of such auxiliary frame about its pivot, ground engaging means also carried by said auxiliary frame and serving to rotate the same to a position in which its center of gravity is at one side of the pivot and both the plow base and ground engaging means are clear of the ground, said auxiliary frame being rotatable by gravity from such position to bring said plow base into contact with the ground.

6. A plow comprising a main frame, an auxiliary frame pivotally mounted on said main frame, a plow base carried by said auxiliary frame and arranged to be brought alternately into operative and inoperative position by the continued rotation of said auxiliary frame about its pivot in the same direction, means for so rotating said auxiliary frame, a movable stop, and a pair of detents carried by said frame to engage said stop to arrest the movement of said auxiliary frame at one of two definite positions, one of said detents having a slip connection with said auxiliary frame.

7. In combination, a main frame, an auxiliary frame horizontally pivoted intermediate its ends on the main frame, an earth working tool on one end of the auxiliary frame and means carried by the tool and by the opposite end of the auxiliary frame respectively, for rotating the auxiliary frame by ground contact during travel.

8. In combination, a main frame, an auxiliary frame rotatably mounted on the main frame, a plow base mounted on the auxiliary frame, and a coulter mounted in said auxiliary frame to maintain a fixed relation to said plow.

9. In combination, a main frame, an auxiliary frame rotatably mounted on the main frame, a plow base mounted on the auxiliary frame, a coulter mounted in said auxiliary frame to maintain a fixed relation to said plow, and a ground engaging member secured to said auxiliary frame for assisting said frame and plow in their rotary movements.

In testimony whereof I affix my signature, in the presence of two witnesses.

CARL W. MOTT.

Witnesses:
H. MacDonald,
E. J. Kane.